United States Patent [19]
Ju

[11] Patent Number: 5,806,992
[45] Date of Patent: Sep. 15, 1998

[54] SHEET THICKNESS SENSING TECHNIQUE AND RECORDING HEAD AUTOMATIC ADJUSTING TECHNIQUE OF INK JET RECORDING APPARATUS USING SAME

[75] Inventor: Young-Bok Ju, Seongnam, Rep. of Korea

[73] Assignee: SamSung Electronics Co., Ltd., Suwon, Rep. of Korea

[21] Appl. No.: 882,936

[22] Filed: Jun. 26, 1997

[30] Foreign Application Priority Data

Jun. 26, 1996 [KR] Rep. of Korea .................. 1996 24077

[51] Int. Cl.$^6$ ..................................................... B41J 11/20
[52] U.S. Cl. ........................... 400/56; 400/120.01; 347/8; 250/559.27
[58] Field of Search ................................. 400/120.01, 56, 400/58, 59, 708; 347/8, 14; 250/559.27

[56] References Cited

U.S. PATENT DOCUMENTS

| | | |
|---|---|---|
| 4,580,914 | 4/1986 | Rich et al. . |
| 4,847,638 | 7/1989 | Moriyama ................................ 400/56 |
| 4,917,512 | 4/1990 | Mimura et al. . |
| 4,927,277 | 5/1990 | Niikawa . |
| 5,051,008 | 9/1991 | Honda et al. . |
| 5,065,169 | 11/1991 | Vincent et al. . |
| 5,088,848 | 2/1992 | De Falco et al. ......................... 400/56 |
| 5,156,464 | 10/1992 | Sakai . |
| 5,193,918 | 3/1993 | Lohrmann et al. . |
| 5,204,537 | 4/1993 | Bennet et al. . |
| 5,227,809 | 7/1993 | Carpenter et al. . |
| 5,257,867 | 11/1993 | Ito et al. . |
| 5,291,227 | 3/1994 | Suzuki ....................................... 347/8 |
| 5,316,395 | 5/1994 | Imai . |
| 5,360,276 | 11/1994 | Petermann . |
| 5,366,301 | 11/1994 | Martin et al. . |
| 5,468,076 | 11/1995 | Hirano et al. . |
| 5,486,063 | 1/1996 | Fox et al. . |
| 5,576,744 | 11/1996 | Niikura et al. . |
| 5,618,120 | 4/1997 | Ishikawa . |

FOREIGN PATENT DOCUMENTS 40-5345411 A  12/1993  Japan ......................................... 347/8

*Primary Examiner*—Eugene H. Eickholt
*Attorney, Agent, or Firm*—Robert E. Bushnell, Esq.

[57] ABSTRACT

A sheet thickness sensing apparatus of an image recording apparatus includes a thickness sensing circuit for generating a sheet thickness value corresponding to a reflective optical quantity sensed by a reflective optical sensor which is separately installed opposite to a reflective surface moving correspondingly according to the thickness of a fed sheet. A head driving enable time or a head gap is adjusted correspondingly to the thickness of the sheet.

28 Claims, 11 Drawing Sheets

SHEET THICKNESS SENSING TECHNIQUE AND RECORDING HEAD AUTOMATIC ADJUSTING TECHNIQUE OF INK JET RECORDING APPARATUS USING SAME

CLAIM OF PRIORITY

This application makes reference to, incorporates the same herein, and claims all benefits accruing under 35 U.S.C. §119 from an application for SHEET THICKNESS SENSING APPARATUS OF IMAGE RECORDING APPARATUS AND RECORDING HEAD AUTOMATIC ADJUSTING APPARATUS AND METHOD OF INK JET RECORDING APPARATUS USING SAME earlier filed in the Korean Industrial Property Office on the 26th day of Jun. 1996 and there duly assigned Ser. No. 24077/1996, a copy of which application is annexed hereto.

BACKGROUND OF THE INVENTION

1. Field of the Invention

The present invention relates to an image recording apparatus and, more particularly, to a technique for automatically sensing the thickness of a sheet and a technique for adjusting a recording head according to the measured thickness of the sheet in an ink jet recording apparatus.

2. Description of the Related Art

An image recording apparatus, such as a printer, a copier, a facsimile machine, etc., records an image on a sheet, for example, paper or an overhead project (OHP) film. In this image recording apparatus, a normal sheet is most widely used, but a thicker or thinner sheet than the normal sheet is also frequently used. Meanwhile, most of the image recording apparatus have been designed on the basis of using the normal sheet. Therefore, if the thickness of the sheet used differs from that of the normal sheet, the recording picture quality deteriorates or a malfunction occurs. For example, in a laser printer using an electrophotographic developing system, if a fixing temperature is constantly maintained irrespective of the thickness of the sheet, since a fixing friction is degraded, the recording picture quality may deteriorate or a paperjam may be generated.

One of the techniques for overcoming the above described disadvantages is disclosed in Korea Patent Application No. 94-12167, filed May 31, 1994, entitled "APPARATUS AND METHOD FOR ADJUSTING FIXING TEMPERATURE" by Seongho Kim, assigned to the same assignee as that of the present invention. Korea Patent Application No. 94-12167 describes a technique for automatically sensing the thickness of a fed sheet and adjusting the fixing temperature according to the kind of sensed sheet. The thickness of the sheet is sensed by sensing the pressure generated as a upper roller of a register roller goes up according to the thickness of the sheet by a pressure sensor. In this case, an actual variation in the pressure generated by a moving amount of the roller corresponding to the thickness of the sheet is small. Therefore, it is difficult to accurately detect an actual variation in the thickness of the sheet. Furthermore, the cost of a product rises because the pressure sensor is used.

A recording system, such as a wire dot system, a thermal transfer (thermosensitive recording) system, an ink jet system, etc., uses a unique recording head. The ink jet system jets ink onto the sheet to record an image. The recording head in the recording apparatus using the inkjet system includes a plurality of nozzles each having a minute ejection hole for jetting the ink. The ink within these nozzles is heated and expanded by a heating element installed correspondingly to each nozzle, thereby jetting the ink to the exterior of the nozzle. The ink jet recording apparatus records a desired image on the sheet by selectively driving the nozzles while the recording head moves in the horizontal direction so as to correspond to an image to be recorded. The recording head is fixed to a carriage driven by a carriage motor, and the carriage moves in the right and left horizontal directions along a transversely extended carrier shaft. Therefore, the recording head also moves to the right and left when the carriage moves.

Meanwhile, since the ink jet recording apparatus records the image by jetting the ink, it is preferable that a gap between the recording head and the sheet, that is, a head gap, be constantly maintained at an optimal state. This is because the size of an ink drop or the shock force of the ink dropped onto the sheet varies according to the head gap, and thus the head gap has a great effect on the recording picture quality. If the head gap becomes narrower or wider than an optimal value, the recording image spreads or a pixel is deformed, thereby lowering the recording picture quality. Therefore, a manufacturer has designed and manufactured the ink jet recording apparatus having the head gap of the optimal state.

However, even if the head gap is adjusted to the optimal state, it is not always maintained at a constant state and varies according to the thickness of the sheet. That is, since the thickness of the used sheet is not always the same and varies with the kind of sheet, the head gap also varies. For example, when the head gap is designed and manufactured on the basis of the normal sheet, if a thicker sheet than the normal sheet, like an envelope or label sheet, is used, the head gap becomes narrower than the optimal value. Therefore, in order to obtain the optional recording picture quality, the head gap should be adoptively adjusted according to the thickness of the sheet. To do this, earlier ink jet recording apparatus include an adjusting lever which can adjust the head gap. The user of the ink jet recording apparatus can narrow or widen the head gap by manipulating the adjusting lever according to the thickness of the sheet. Therefore, even if the thickness of the sheet varies, the optimal recording picture quality can be obtained.

However, when the adjusting lever is used, there is an inconvenience in that the user must manipulate the adjusting lever manually. Therefore, even if the thickness of the sheet varies, the user may not vary the head gap or may manipulate the adjusting lever improperly, thereby lowering the recording picture quality. Further, if a thick sheet is used, since the head gap becomes narrow, the carriage may be caught on the sheet and the carriage motor may stop.

The patent to Niikawa, U.S. Pat. No. 4,927,277, entitled Printer Having A Device For Adjusting The Printing Condition, Depending Upon Paper Thickness, illustrates an image recording apparatus including a device for sensing the thickness of a sheet of paper and for adjusting the printing condition of a print head in response thereto.

The patent to Sakai, U.S. Pat. No. 5,156,464, entitled Printer Having Gap Adjusting Apparatus For Print Head, discloses an image forming apparatus in which the gap between the printhead and paper is adjusted based on the measured paper thickness.

The Mimura et al. patent, U.S. Pat. No. 4,917,512 illustrates an image recording apparatus including a device for sensing the thickness of a sheet of paper and for adjusting the printing condition of a print head in response thereto.

The Rich et al. patent, U.S. Pat. No. 4,580,914, entitled Apparatus And Method For Positioning An Ink-Jet Printing Head, discloses a technique for positioning the printhead of an ink jet printer to maintain a desired gap between the paper and the printhead.

The Bennet et al. patent, U.S. Pat. No. 5,204,537, entitled Thickness Sensor Comprising A Leaf Spring Means, And A Light Sensor discloses another thickness sensor which utilizes a photoelectric arrangement to measure the thickness of paper.

The following additional patents each disclose features in common with the present invention but are not believed to be as pertinent as the patents discussed in detail above: U.S. Pat. No. 5,227,809 to Carpenter et al., entitled Automatic Print Head Spacing Mechanism For Ink Jet Printer, U.S. Pat. No. Ito et al., entitled Printer With Print Gap Control, U.S. Pat. No. 5,193,918 to Lohrmann et al., entitled Print-Head Positioning system Having A Paper Sensor, U.S. Pat. No. 5,468,076 to Hirano et al., entitled Print Gap Adjusting Device, U.S. Pat. No. 5,486,063 to Fox et al., entitled Method And Apparatus For Sensing The Length Of Label Or Tag Media By detecting Changes In Relative Thickness, U.S. Pat. No. 5,366,301 to Martin et al, entitled Record Media Gap Adjustment System For Use In Printers, U.S. Pat. No. 5,360,276 to Petermann, entitled Printing Device With Adjustable Printing Head Gap, U.S. Pat. No. 5,051,008 to Honda et al., entitled Automatic Gap Adjusting Mechanism, U.S. Pat. No. 5,065,169 to Vincent et al., entitled Device To Assure Paper Flatness And Pen-To-Paper Spacing During Printing, U.S. Pat. No. 5,576,744 to Niikura et al., entitled Recording Apparatus And Method Compensating For Varying Gap Between Recording Head And Recording Medium, U.S. Pat. No. 5,316,395 to Imai, entitled Printing Apparatus Having Head Gap Adjusting Device, and U.S. Pat. No. 5,618,120 to Ishikawa, entitled Recording Apparatus Having Means For Detecting The Positions Of A recording Medium.

SUMMARY OF THE INVENTION

It is therefore an object of the present invention to provide a sheet thickness sensing apparatus which can accurately sense a variation in the thickness of a sheet.

It is another object of the present invention to provide a recording head automatic adjusting technique which can maintain optimal recording picture quality adoptively according to the thickness of a sheet in an ink jet recording apparatus.

It is still another object of the present invention to provide a recording head automatic adjusting technique and method which can constantly maintain a head gap even though the thickness of a sheet varies in an ink jet recording apparatus.

The present invention includes a sheet thickness sensing apparatus. One embodiment of the sheet thickness sensing apparatus includes a thickness sensing circuit having a reflective optical sensor which is separately installed opposite to a reflective surface moving correspondingly according to the thickness of a fed sheet. The thickness sensing circuit generates a sheet thickness value corresponding to a reflective optical quantity sensed by the reflective optical sensor.

The present invention also includes a recording head automatic adjusting apparatus and method. In one embodiment, the thickness of a fed sheet is sensed, and a head driving enable time or a head gap is adjusted correspondingly to the sensed thickness of the sheet. The head driving enable time is an enable time of a driving pulse for driving nozzles of a recording head. To adjust the head gap, the height of the recording head is adjusted.

The present invention will be more specifically described with reference to the attached drawings. In the drawings, like reference numerals or symbols designate like elements throughout several views. In the following description, numerous specific details, such as mechanism structures, circuit constructions, elements, processing flows, etc., are set forth to provide a more thorough understanding of the present invention. It will be apparent, however, to one skilled in the art, that the present invention may be practiced without these specific details. In other instances, well known features and constructions have not been described so as not to obscure the present invention. For convenience, the present invention applied to an inkjet printer is described by way of an example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
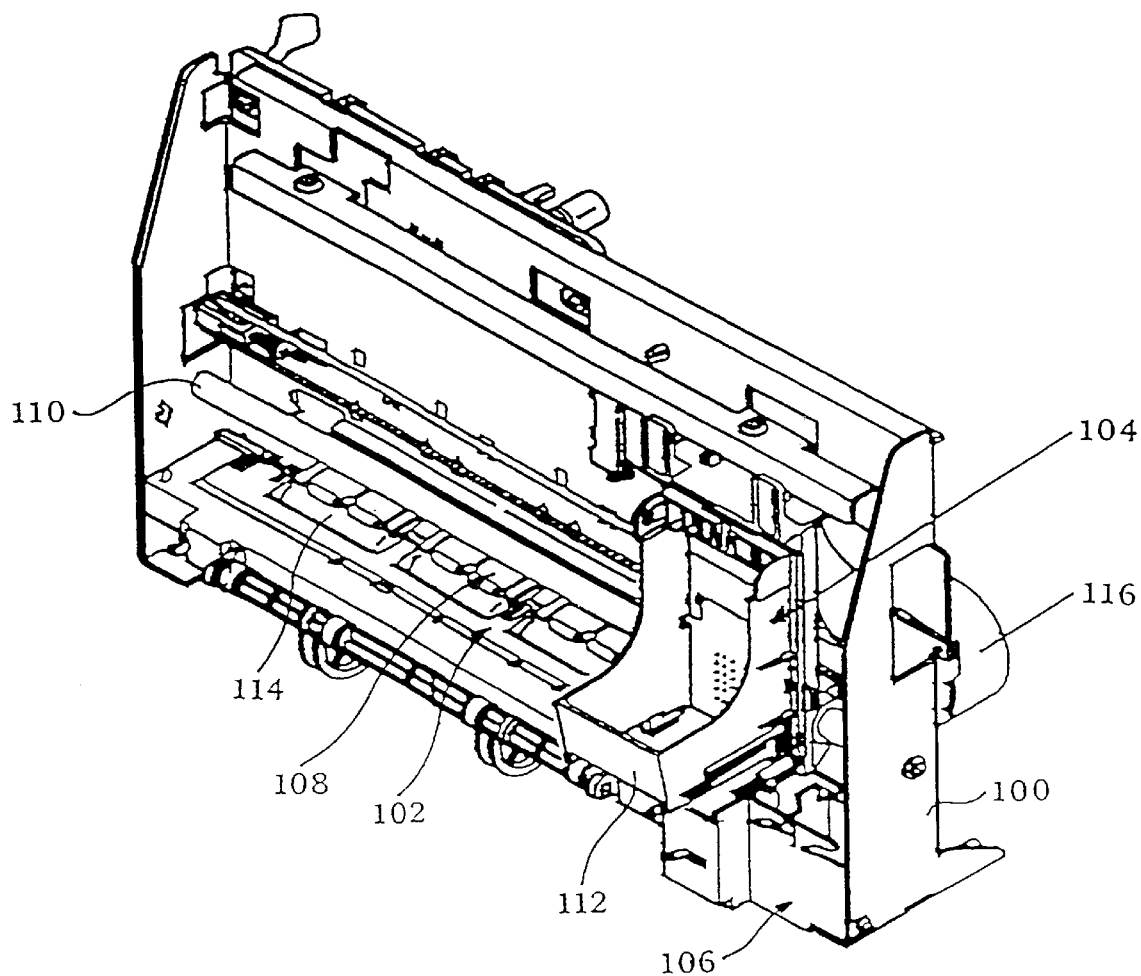
FIG. 1 is a front perspective view showing a mechanism structure of a print engine of an ink jet printer.
Figure 2:
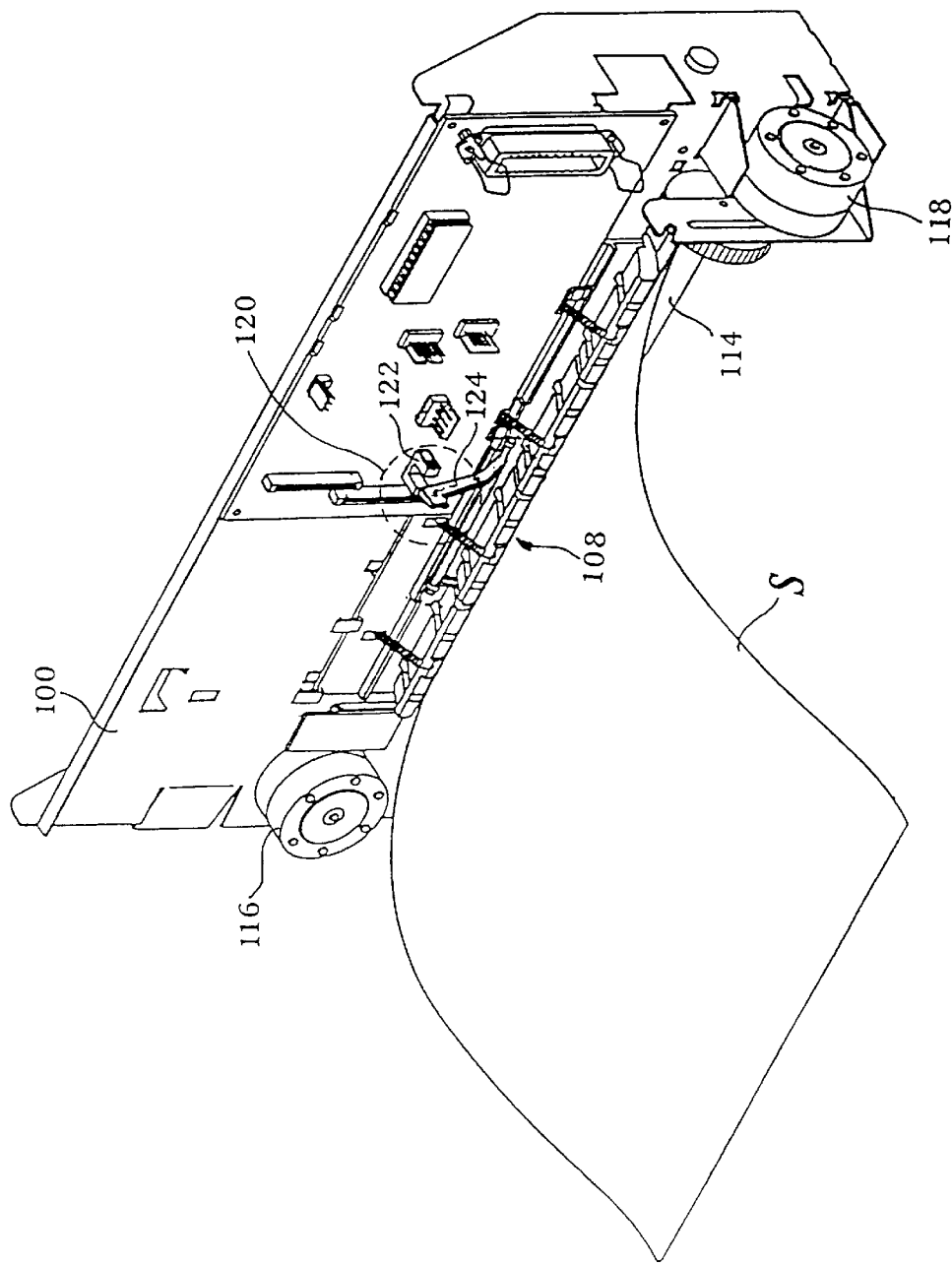
FIG. 2 is a rear perspective view of FIG. 1.

Front and rear perspective views showing a mechanism structure of a print engine of an ink jet printer are illustrated in FIGS. 1 and 2, respectively. The print engine includes a line feed mechanism 102, a carriage mechanism 104, a home assembly 106, a friction roller assembly 108, a carriage motor 116, a line feed motor 118, etc, and theses are assembled and installed in a frame 100. A reference symbol S designates a sheet.

Figure 3:
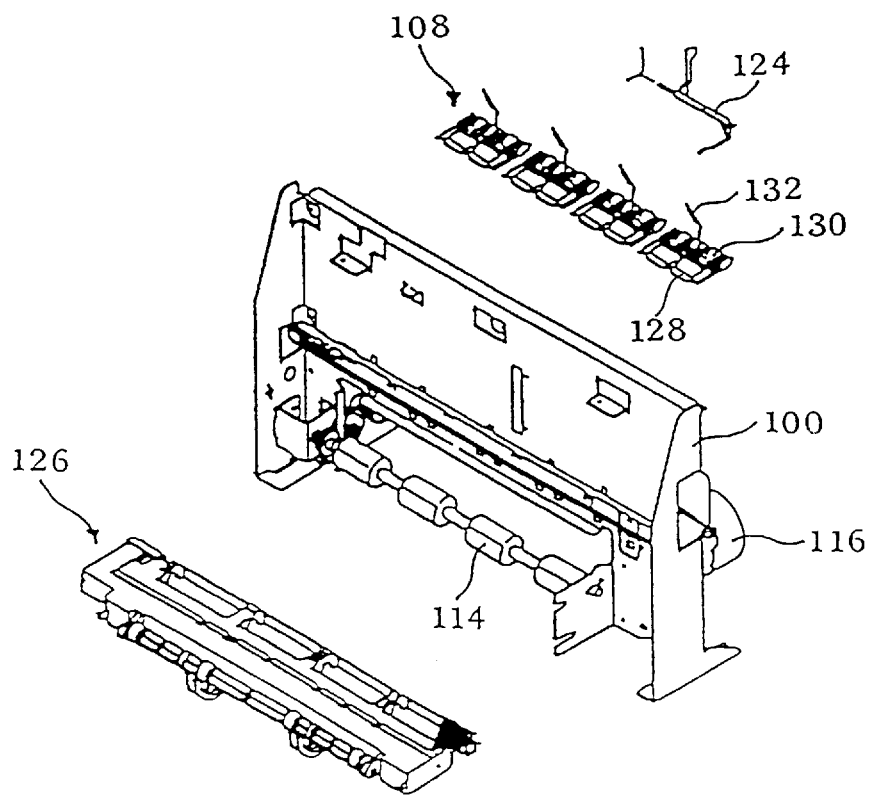
FIG. 3 is an exploded perspective view of a line feed mechanism and a friction roller assembly shown in FIG. 1.

The line feed mechanism 102 includes, as shown in an exploded perspective view of FIG. 3, a frame base assembly 126 and a feed roller 114. The line feed mechanism 102 conveys the sheet fed as indicated in FIG. 2 from a pickup unit (not shown) toward a recording head (not shown) mounted in a carriage 112 of the carriage mechanism 104. Generally, the recording head is provided by an ink cartridge (not shown) unified with an ink container. The ink cartridge is exchangeable, and the recording head is installed opposite to the surface of the sheet at the bottom of the ink cartridge. If the sheet is inserted into a contact surface between the feed roller 114 and a friction roller 128, the sheet is conveyed toward the recording head by the feed roller 114 rotated by the line feed motor 118 to record an image and ejected to the exterior.

Whether the sheet reaches a position between the feed roller 114 and the friction roller 128 is sensed by a sheet sensor 120 consisting of a transmission optical sensor 122 and an actuator feed 124. The actuator feed 124 is installed just in front of the feed roller 114 and the friction roller 128, and cuts off an optical path between a luminous element and a light receiving element of the optical sensor 122. Under Such a state, if the sheet is fed, the actuator feed 124 is pushed by a front end of the sheet. Therefore, a light of the luminous element of the optical sensor 122 is transmitted to the light receiving element thereof, and the sheet sensor 120 senses that the sheet reaches a position between the feed roller 114 and the friction roller 128.

The carriage mechanism 104 shifts the ink cartridge mounted in the carriage 112 in the horizontal direction by the carriage motor 116. The carriage 112 moves in the right and left horizontal direction along a transversely extended carrier shaft 110. The home assembly 106 caps the recording head when the carriage 112 moves to a home position while the printer is not used. The capping represents that the recording head is covered with a cap in order to prevent ink within a nozzle of the recording head from drying or being polluted. In this case, the nozzle is typically cleaned up.

On the other hand, the friction roller assembly 108 consists of a plurality of sub assemblies each having the friction roller 128, a friction roller guide 130 and a tension spring 132, and presses the sheet to the feed roller 114. In each sub assembly, the friction roller 128 is installed at an axis parallel to the fees roller 114 and is in contact with the feed roller 114. One end of the friction roller guide 130 is connected to the friction roller 128, and the other end thereof is connected to the spring 132 fixed to the frame 100. Hence, the friction roller guide 130 elastically presses the friction roller 128 to the feed roller 114.

Figure 4:
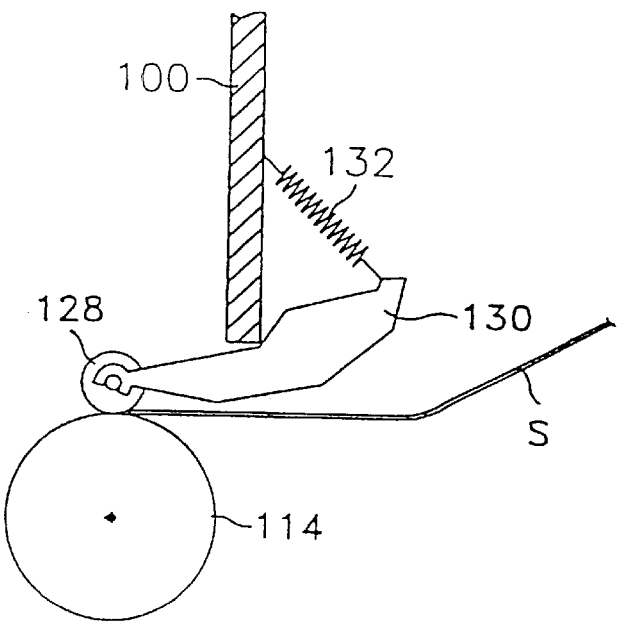
FIG. 4 is a side view showing a structure related to the conveyance of a sheet of a feed roller and a friction roller assembly shown in FIG. 3.

A structure related to the conveyance of the sheet of the feed roller 114 and the friction roller assembly 108 is shown in FIG. 4. An opposite side of the friction roller guide 130 connected to the friction roller 128 which is in contact with the feed roller 114 is pulled by the spring 132 in the direction of the frame 100, and thus the friction roller 128 presses the feed roller 114. Under such a state, if the sheet reaches the feed roller 114, the friction roller 128 is lifted by the thickness of the sheet by the insertion of the sheet but continues to elastically press the sheet to the feed roller 114. Therefore, the sheet is conveyed toward the recording head.

An operation of the friction roller guide 130 during the conveyance of the sheet will now be described in detail. If the sheet is inserted between the feed roller 114 and the friction roller 128, an opposite side of the friction roller guide 130 connected to the friction roller 128 moves in a direction opposite to a moving direction of the friction roller 128 shifted by the sheet. That is, a part of the friction roller guide 130 connected to the friction roller 128 is lifted up by the sheet, while a part of the friction roller-guide 130 connected to the spring 132 goes down. The moving amount corresponds to the thickness of the sheet.

The present invention automatically senses the thickness of the fed sheet in consideration of the above principles. Furthermore, the recording head is adjusted correspondingly to the sensed thickness of the sheet. Therefore, the optimal recording picture quality can be adoptively maintained according to the thickness of the sheet.

Figure 5:
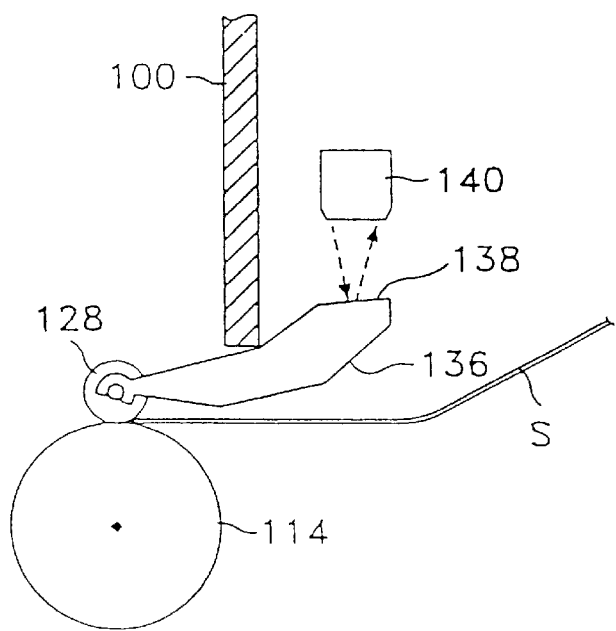
FIG. 5 shows a mechanism structure of a sheet thickness sensing apparatus according to the present invention.

FIG. 5 shows a mechanism structure of a sheet thickness sensing apparatus for sensing the thickness of the sheet according to the present invention. Instead of the friction roller guide 130 shown in FIG. 4, a friction roller guide 136 having a reflective surface 138 is used, and a reflective optical sensor 140 is separately installed opposite to the reflective surface 138. That is, the optical sensor 140 is fixed to the frame 100 so that the luminous element and the light receiving element of the optical sensor 140 may be opposite to the reflective surface 138. The reflective surface 138 and the optical sensor 140 are installed at a portion to which the spring 132 is not connected from the roller guide 136. In FIG. 5, the spring 132 is not shown to avoid confusion because the spring 132 is overlapped with the optical sensor 140 if it is shown. Furthermore, the reflective surface 138 and the optical sensor 140 are installed at one of the plurality of sub assemblies of the friction roller assembly 108, preferably at the sub assembly beside the home position. This is because the size of the sheet is not uniform. Since the home position is a reference position, even if the size of the sheet differs, the sheet passes through the home position and therefore the thickness of the sheet can be sensed.

Figure 6A:
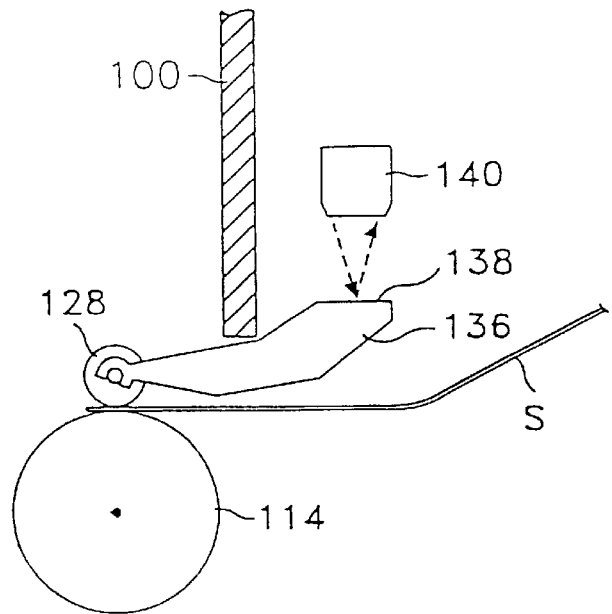
FIGS. 6A and 6B show examples of an operation state of the sheet thickness sensing apparatus of FIG. 5 according to a variation in the thickness of a sheet.
Figure 6B:
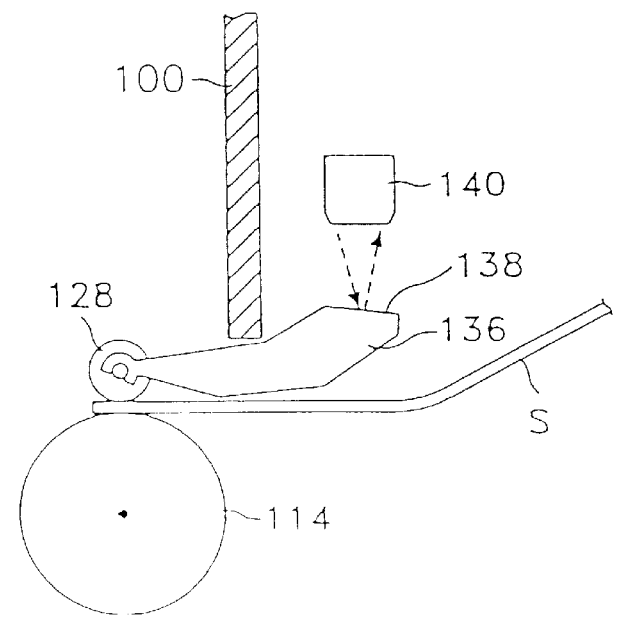

In the thickness sensing apparatus of FIG. 5, a reflective optical quantity of the optical sensor 140 with respect to the reflective surface 138 is determined by a gap between the reflective surface 138 and the optical sensor 140. The reflective surface 138 moves in a direction opposite to the moving direction of the friction roller 128 shifted by the thickness of the sheet by an operation of the friction roller guide 136. In other words, if the sheet is inserted between the feed roller 114 and the friction roller 128, a part of the friction roller guide 136 connected to the friction roller 128 is lifted by the sheet, while the reflective surface 138 goes down. Since the moving amount corresponds to the thickness of the sheet, a gap between the reflective surface 138 and the optical sensor 140 varies with the thickness of the sheet. Consequently, the reflective optical quantity of the optical sensor 140 varies in proportion to the thickness of the sheet. Namely, the reflective optical quantity gradually decreases as the thickness of the sheet becomes thicker, and gradually increases as the thickness of the sheet becomes thinner. If there is no sheet, the reflective optical quantity reaches the maximum. Examples of an operation state of the sheet thickness sensing apparatus of FIG. 5 according to a variation in the thickness of the sheet are shown in FIGS. 6A and 6B. FIGS. 6A and 6B illustrate relative operation states when the thickness of the sheet differs, FIG. 6A being the case the thickness of the sheet is thin and FIG. 6B being the case the thickness of the sheet is thick.

The optical sensor 140 generates a sensing signal of a voltage level corresponding to the reflective optical quantity supplied to the light receiving element. Typically, since an output characteristic of the optical sensor 140 is linear, the reflective optical quantity and the voltage level of the sensing signal are linear. Therefore, the thickness of the sheet can be sensed by the sensing signal generated from the optical sensor 140.

Consequently, unlike Korea Patent Application No. 94-12167, since the thickness of the sheet is sensed by a variation in the reflective optical quantity according to the thickness of the sheet, a variation in the thickness of the sheet can be accurately sensed. Moreover, since the optical sensor of a lower cost than that of the pressure sensor is used, the cost of a product can be lowered.

In the above embodiment, although the thickness of the sheet is sensed by the reflective optical sensor 140 using the conventional friction roller assembly 108, it is possible to sense the thickness of the sheet by adding the thickness sensing apparatus according to the present invention to a sheet convey path if the friction roller assembly 108 is not used.

Figure 7:
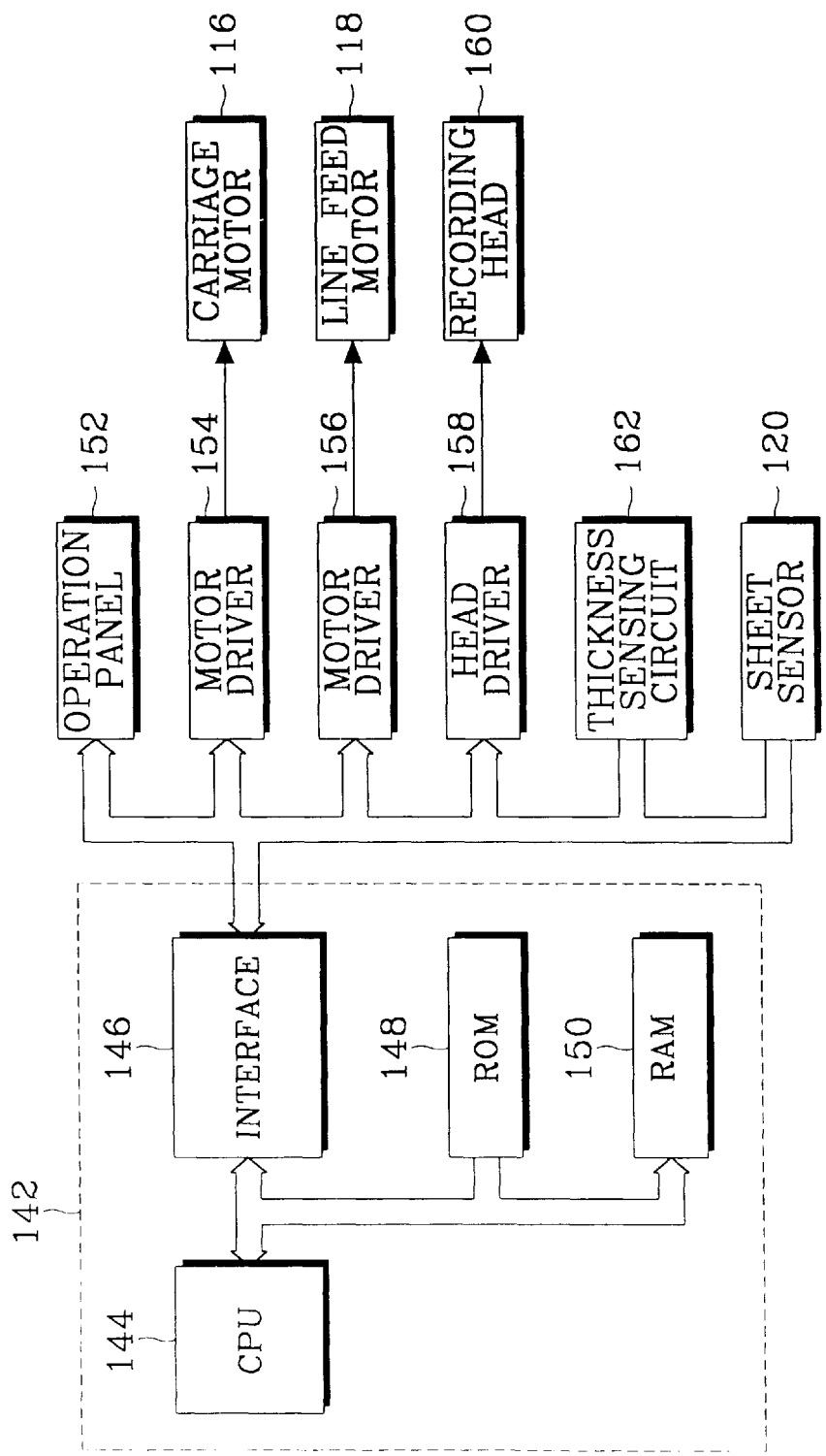
FIG. 7 is a block diagram showing a circuit construction of a first embodiment according to the present invention.
Figure 8:
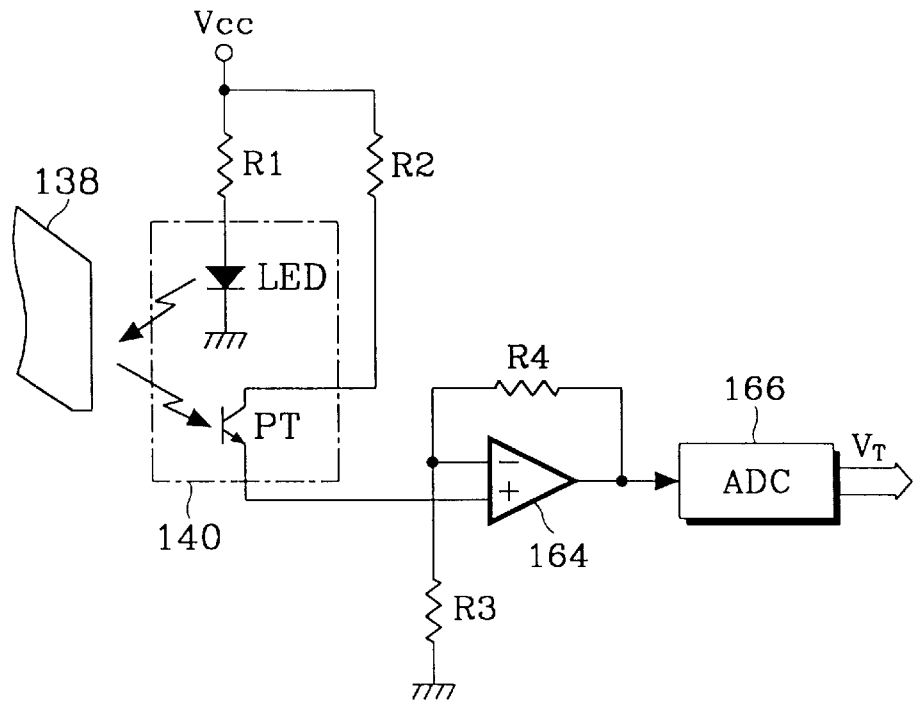
FIG. 8 is a detailed circuit diagram of a thickness sensing circuit shown in FIG. 7.
Figure 10:
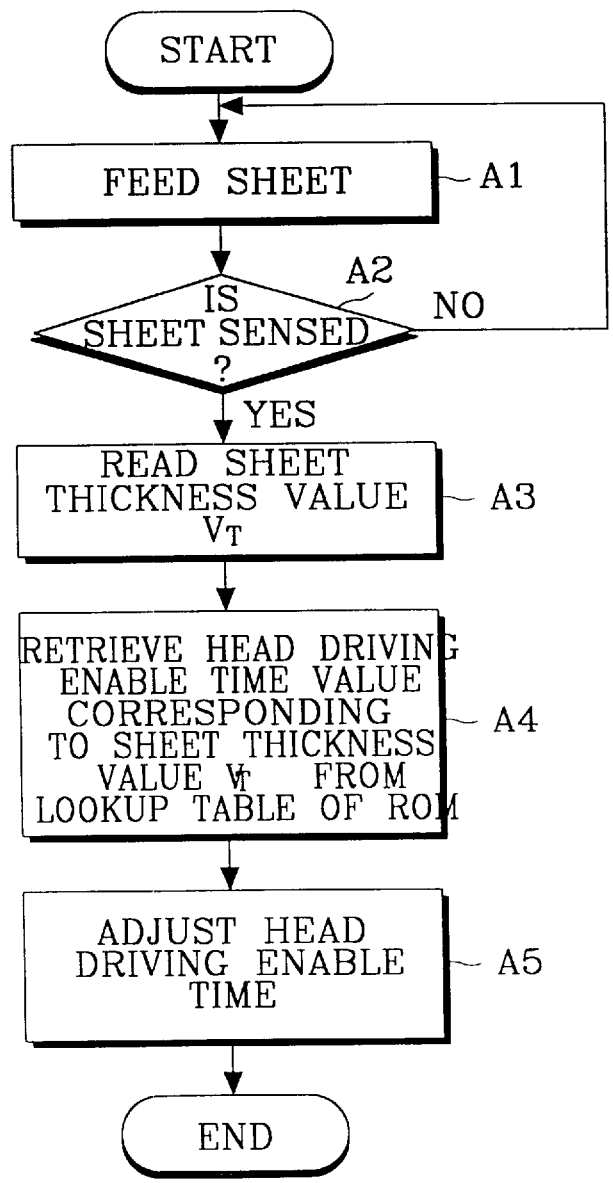
FIG. 10 is a flow chart showing processing of a CPU shown in FIG. 7 according to the present invention.

FIG. 7 is a block diagram showing a circuit construction for adjusting the recording head by automatically sensing the thickness of the sheet. In FIG. 7, a thickness sensing circuit 162 constructed as shown in FIG. 8 is added to the typical ink jet printer, and a recording head adjusting function performed by a CPU (central processing unit) 144 of a controller 142 as indicated in FIG. 10 is programmed in a ROM 148. Therefore, basic functions of other parts are the same as the typical ink jet printer.

Referring to FIG. 7, the controller 142 has the CPU 144, an interface 146, the ROM (read only memory) 148 and a RAM (random access memory) 150. The CPU 144 executes a program stored in the ROM 148 and controls each part of the printer through the interface 146. An execution program of the CPU 144 and various reference data are stored in the ROM 148. Data generated during an operation of the CPU 144 is temporarily stored in the RAM 150. The interface 146 interfaces input/output signals between the CPU 144 and input/output devices, that is, signals between the CPU 144, and an operation panel 152, motor drivers 154 and 156, a head driver 158, a thickness sensing circuit 162 and a sheet sensor 120. The operation panel 152 has a plurality of buttons for receiving various commands and a display unit for displaying various operation states by the control of the CPU 144. The motor driver 154 drives the carriage motor 116 by the control of the CPU 144. The carriage motor 116 is driven by the motor driver 154 and shifts the carriage 112 in the horizontal direction. The motor driver 156 drives the line feed motor 118 by the control of the CPU 144. The line feed motor 118 is driven by the motor driver 156 and feeds and conveys the sheet. The head driver 158 drives a recording head 160 mounted in the carriage 112 by the control of the CPU 144 and records an image on the sheet. The recording head 160 has a plurality of nozzles and is driven by the head driver 158. The recording head 160 records the image on the sheet by jetting ink through the nozzles. The thickness sensing circuit 162 includes, as described previously, the optical sensor 140 and supplies a sheet thickness value corresponding to the reflective optical quantity to the CPU 144. The sheet sensor 120 installed as indicated in FIG. 2 senses the sheet and informs the CPU 144 that the sheet is fed.

FIG. 8 is a detailed circuit diagram of the thickness sensing circuit 162 shown in FIG. 7. The luminous element of the optical sensor 140, that is, a light emitting diode LED is forwardly connected between a power source voltage Vcc through a resistor RI and a ground. The light receiving element of the optical sensor 140, that is, a phototransistor PT is connected between the power source voltage Vcc through a resistor R2 and a noninverting input terminal (+) of an amplifier 164. Therefore, a sensing signal having the voltage level corresponding to the reflective optical quantity is generated by the phototransistor PT. The sensing signal is amplified by the amplifier 164 and supplied to an analog-to-digital converter (ADC) 166. The ADC 166 converts the sensing signal into digital data having a value corresponding to its voltage level and supplies the digital data to the CPU 144 through the interface 146 as a thickness sensing value $V_T$.

Figure 9:
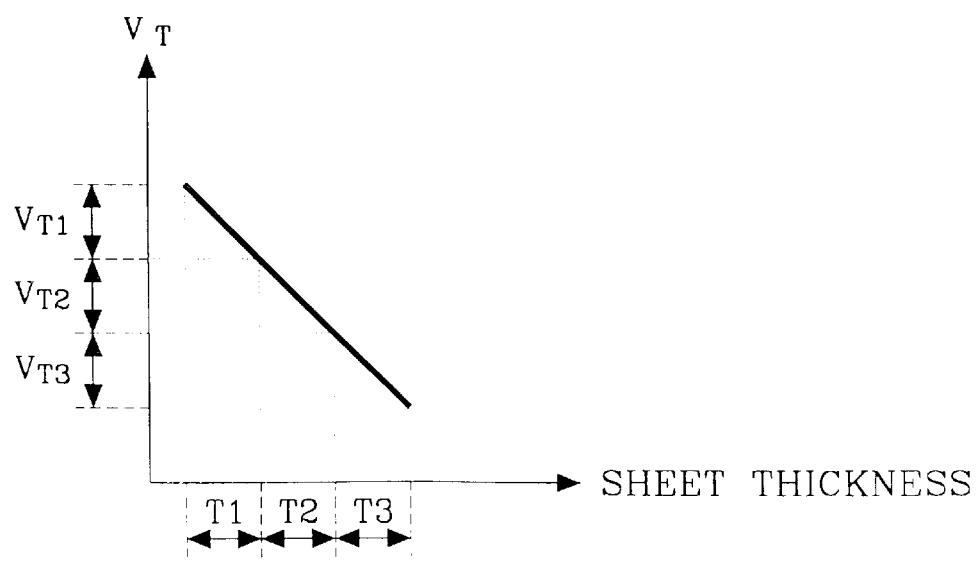
FIG. 9 is a graph showing an output state of the thickness sensing circuit of FIG. 8 as a function of a variation in the thickness of a sheet.

An output state of the thickness sensing circuit 162 as a function of a variation in the thickness of the sheet is indicated in FIG. 9. When classifying the thickness of the sheet into 3 ranges of TI, T2 and T3, the thickness sensing value $V_T$ varies. $T_I$ is a thickness range of a relatively thin sheet, T2 is a thickness range of a medium sheet, and T3 is a thickness range of a thick sheet. The CPU 144 confirms the thickness sensing value $V_T$ generated from the thickness sensing circuit 162, and judges that the Currently fed sheet is a thin sheet if the thickness sensing value $V_T$ within the range Of $V_{T1}$, that it is a medium sheet if $V_T$ within the range $V_1$, and that it is a thick sheet if $V_T$ is within the range $V_{T3}$.

FIG. 10 is a processing flow of the CPU 144 shown in FIG. 7 according to the present invention. There is shown a process for sensing the thickness of the sheet by the thickness sensing circuit 162 when the sheet reaches the thickness sensing apparatus of FIG. 5 after feeding the sheet and for adjusting a head driving enable time of the recording head correspondingly to the sensed thickness of the sheet.

An example of an operation for sensing the thickness of the sheet and for adjusting the driving enable time of the recording head 160 by using the thickness sensing apparatus of FIG. 5 in the ink jet printer of FIG. 7 will now be described in detail with reference to FIG. 10.

The CPU 144 starts to feed the sheet from the pickup unit (not shown) by driving the line feed motor 118 in response to a print start command at step Al. The CPU 144 checks whether the sheet is sensed by the sheet sensor 120 at step A2. Generally, when feeding the sheet, the CPU 144 backwardly rotates the line feed motor 118 to rotate a pickup roller (not shown). When the sheet reaches the sheet sensor 120, the CPU 144 forwardly rotates the line feed motor 118 to rotate the feed roller 114. If the line feed motor 118 is backwardly rotated, power is transmitted only to the pickup roller and not transmitted to the feed roller 114. If the line feed motor 118 is forwardly rotated, the power is transmitted not to the pickup roller but to the feed roller 114. Therefore, if the sheet reaches the feed roller 114, a front end of the sheet temporarily stops until the feed roller 114 starts to rotate under the state that it is inserted between the feed roller 114 and the friction roller 128. Hence, the sheet is aligned.

If the sheet is sensed by the sheet sensor 120, the front end of the sheet stops under the state it is inserted between the feed roller 114 and the friction roller 128. Then the CPU 144 reads the sheet thickness value $V_T$ generated from the thickness sensing circuit 162 at step A3. As mentioned above, the sheet thickness value $V_T$ corresponds to the thickness of the sheet. The CPU 144 retrieves the head driving enable time corresponding to the sheet thickness value $V_T$ from a lookup table previously stored in the ROM 148 at step A4. The lookup table is listed below in Table 1.

TABLE 1

| Thickness of sheet | Sheet thickness value $V_T$ | Head driving enable time |
|---|---|---|
| thin | $V_{T1}$ | 3.0 μs |
| medium | $V_{T2}$ | 2.5 μs |
| thick | $V_{T3}$ | 2.0 μs |

If the head driving enable time corresponding to the range of the sheet thickness value $V_T$ is retrieved from the above Table 1, the CPU 144 alters the head driving enable time of the recording head 160 to the retrieved head driving enable time at step A5. That is, the CPU 144 adjusts the head driving enable time correspondingly to the range of the sheet thickness value $V_T$ among a plurality of differently set adjusting ranges. If the thickness of the sheet is thin, the CPU 144 lengthens the head driving enable time, and if the thickness of the sheet is thick, it shortens the head driving enable time. However, if the fed sheet is the same as the previous sheet, there is no need to adjust the head driving enable time. Generally, since the head driving enable time is adjusted by the CPU 144 by controlling the head driver 158, the detailed description therefor is omitted.

By the above described operation, if the thickness of the sheet is thin, the size of an ink drop jetted from the recording head 160 becomes larger by lengthening the head driving enable time. If the thickness of the sheet is thick, the size of the ink drop becomes smaller by shortening the head driving enable time. After the recording head is adjusted, a printing operation is started.

Therefore, even though the thickness of the sheet varies, since the head driving enable time is automatically adjusted, the size of the ink drop or the shock power dropped onto the sheet is constantly maintained and thus optimal recording picture quality can be obtained.

Figure 11:
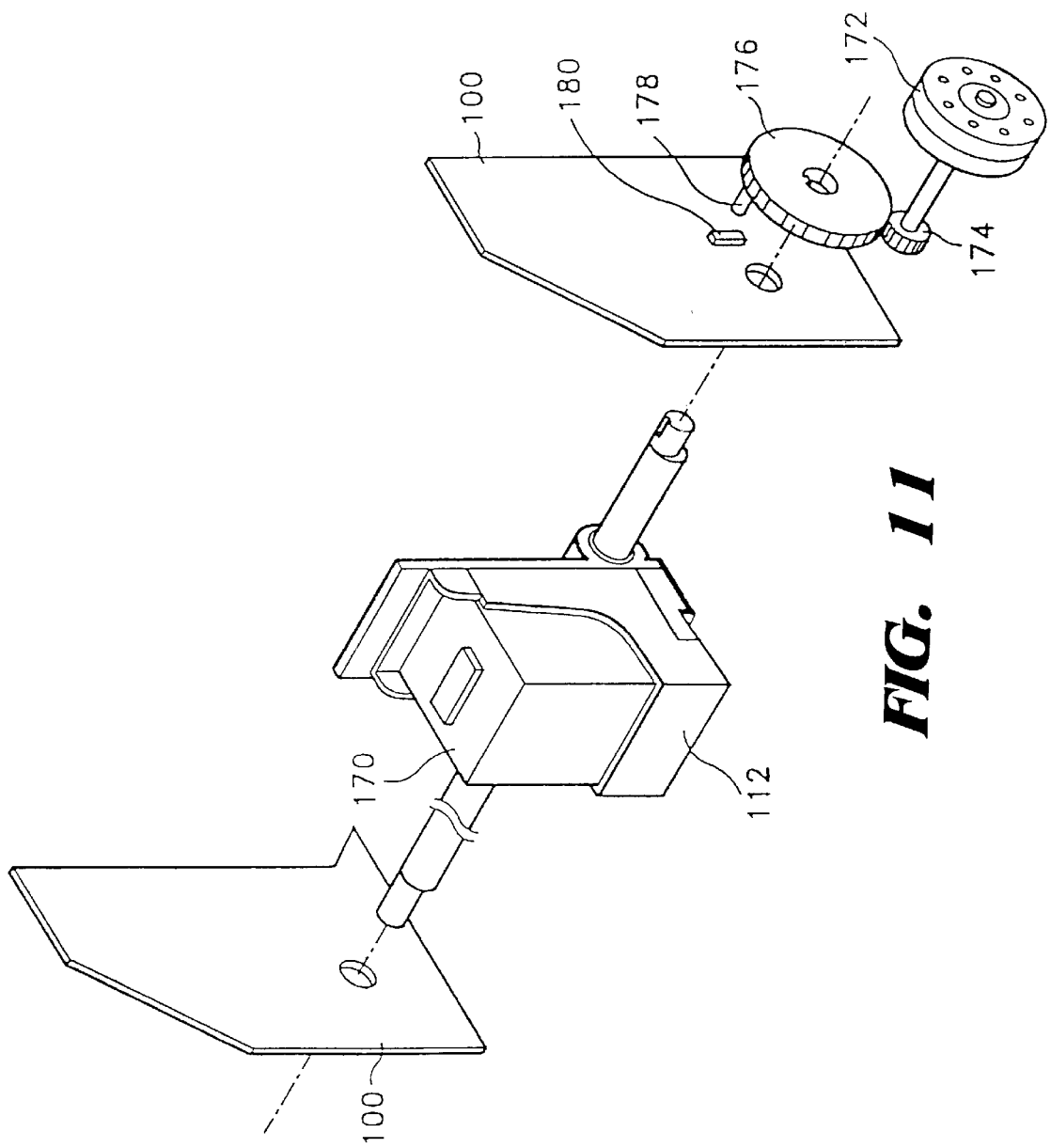
FIG. 11 is a perspective view of a gap adjusting apparatus according to the present invention.
Figure 12:
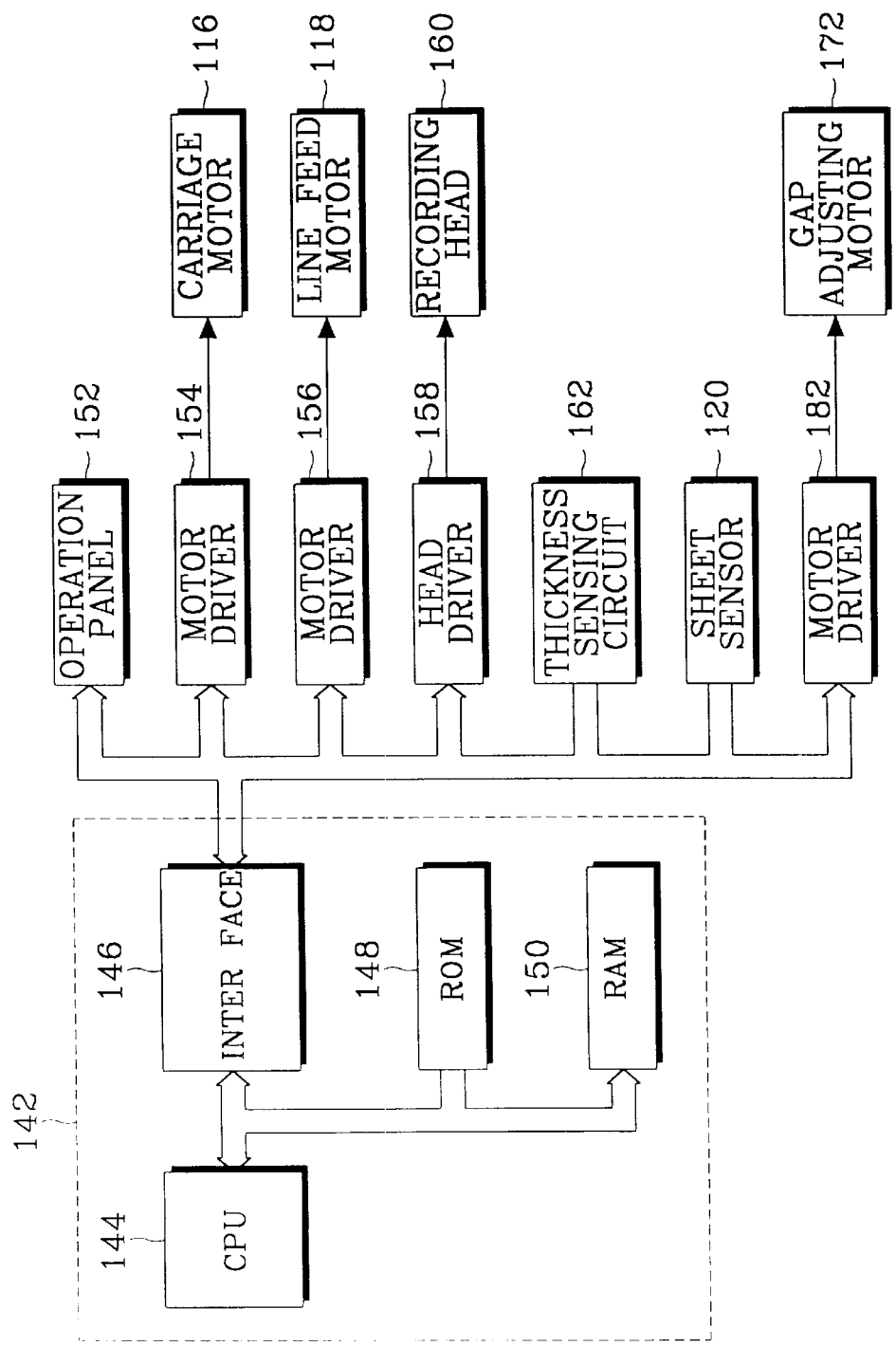
FIG. 12 is a block diagram showing a circuit construction of a second embodiment according to the present invention.

Meanwhile, even if ahead gap is adjusted instead of adjusting the driving enable time of the recording head 160 according to the thickness of the sheet, the same result can be obtained. To this, a gap adjusting apparatus is shown in FIG. 11, and a circuit construction according thereto is illustrated in FIG. 12. In FIG. 12, a motor driver 182 and a gap adjusting motor 172 are added to the circuit construction of FIG. 7.

FIG. 11 is a perspective view of the gap adjusting apparatus according to the present invention. A carrier shaft 168 provides a horizontal moving axis for an ink cartridge 170, that is, for the carriage 112. The carrier shaft 168 has a cam structure and both horizontal end portions thereof are rotated at the frame 100, unlike the typical carrier shaft I 10. This carrier shaft 168 is rotated by the gap adjusting motor 172. A gear 174 installed at a rotary axis of the gap adjusting motor 172 is connected to a gear 176 installed at one horizontal end portion of the carrier shaft 168. A locked projection 180 projecting from the frame 100 is for setting an initial position of a cam part of the carrier shaft 168 and causes a rib 178 protruding from the gear 176 to be correspondingly locked to the locked projection 180.

The carrier shaft 168 shown in FIG. 11 illustrates an its initial state. The CPU 144 shown in FIG. 12 initializes the position of the recording head before adjusting the head gap by the gap adjusting motor 172. In more detail, the CPU 144 rotates the gap adjusting motor 172 clockwise through the motor driver 182 by a constant distance. In this case, the motor driver 182 drives the gap adjusting motor 172 by the control of the driving direction and of the number of pulses of the CPU 144. Then the gear 176 is rotated counterclockwise. If the rib 178 of the gear 176 is locked to the locked projection 180, the gear 176 stops rotating, and the carrier shaft 168 becomes an initial state. In this initial state, the height of the horizontal moving axis of the carrier shaft 168 is the lowest state. Therefore, the height of the carriage 112 is also the lowest state, and the height of the recording head 160 fixed to the bottom of the ink cartridge 170 becomes the lowest state. An initially distance for rotating the gap adjusting motor 172 is appropriately set in consideration of the previous height of the recording head 160, that is, the previous position of the rib 178.

If the gap adjusting motor 172 is rotated counterclockwise, the gear 176 and the carrier shaft 168 are rotated clockwise, and the height of the ink cartridge 170 or the height of the recording head 160 becomes high. Under the state that the height of the recording head 160 is higher than the initial state, if the gap adjusting motor 172 is rotated clockwise, the gear 176 and the carrier shaft 168 are rotated counterclockwise, and the height of the recording head 160 becomes again low. That is, the head gap can be automatically adjusted by adjusting the height of the recording head 160 using the gap adjusting apparatus according to the thickness of the sheet.

Figure 13:
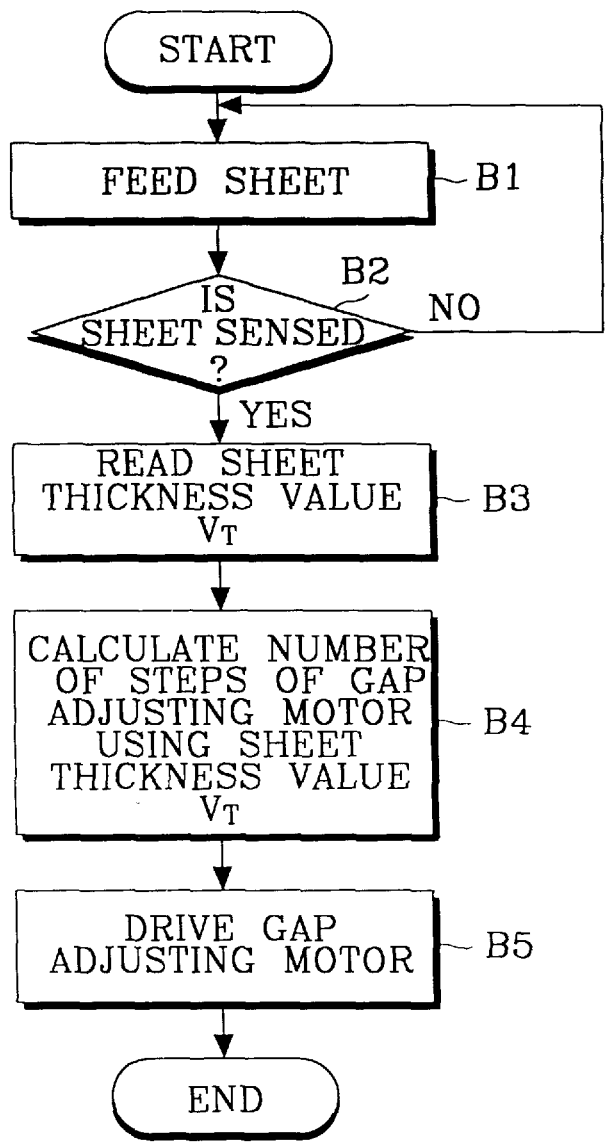
FIG. 13 is a flowchart showing processing of a CPU shown in FIG. 12 according to the present invention.

FIG. 13 is a processing flow of the CPU 144 shown in FIG. 12. There is shown a process for sensing the thickness of the sheet by the thickness sensing circuit 162 when the sheet reaches the thickness sensing apparatus of FIG. 5 after the sheet is fed and for adjusting the head gap by the gap adjusting apparatus of FIG. 11 correspondingly to the sensed thickness of the sheet.

An example of an operation for sensing the thickness of the sheet and for adjusting the head gap by using the thickness sensing apparatus of FIG. 5 and the gap adjusting apparatus of FIG. 11 in the ink jet printer of FIG. 12 will now be described in detail with reference to FIG. 13.

The CPU 144 starts to feed the sheet from the pickup unit by driving the line feed motor 118 in response to a print start signal at step B1. The CPU 144 checks whether the sheet is sensed at step B2. If the sheet is sensed, the CPU 144 reads the sheet thickness value $V_T$ generated from the thickness sensing circuit 162 at step B3. The CPU 144 retrieves the number of steps of the gap adjusting motor 172 on the basis of the sheet thickness value $V_T$ from a lookup table previously stored in the ROM 148 at step B4. The lookup table is listed below in Table 2.

TABLE 2

| Thickness of sheet | Sheet thickness value $V_T$ | Number of pulses |
| --- | --- | --- |
| thin | $V_{T1}$ | 20 |
| medium | $V_{T2}$ | 25 |
| thick | $V_{T3}$ | 30 |

If the number of pulses corresponding to the range of the sheet thickness value $V_T$ from the above Table 2 is retrieved, the CPU 144 drives the gap adjusting motor 172 by controlling the motor driver 182 at step B5, thereby adjusting the head gap. At this time, the CPU 144 adjusts the height of the recording head to the initial state and rotates the gap adjusting motor 172 counterclockwise by the retrieved number of pulses. Namely, the CPU 144 adjusts the head gap correspondingly to the range of the thickness of the sheet $V_T$ among a plurality of differently set adjusting ranges. If the thickness of the sheet is thin, the CPU 144 makes the height the recording head 160 lower by driving the gap adjusting motor 172 by the smaller number of pulses. If the thickness of the sheet is thick, the CPU 144 makes the height of the recording head 160 higher by driving the gap adjusting motor 172 by the larger number of pulses. However, if the fed sheet is the same as the previous sheet, there is no need to adjust the height of the recording head 160.

By the above described operation, if the thickness of the sheet is thin, the height of the recording head 160 is lowered. If the thickness of the sheet is thick, the height of the recording head 160 is raised, thereby constantly maintaining the head gap. Under the state that the recording head is adjusted, a printing operation is started.

Therefore, since the head gap is adoptively adjusted even though the thickness of the sheet varies, the head gap is maintained at a constant state, and thus the optimal recording picture quality can be obtained.

As noted above, the present invention not only senses the thickness of the sheet accurately but also lowers the cost of a product by using the optical sensor instead of the pressure sensor. Moreover, the user need not manipulate the adjusting lever since the recording head is automatically adjusted according to the thickness of the sheet, and the optimal recording picture quality can be maintained.

While there have been shown and described what are considered to the preferred embodiments of the present invention, it will be apparent to those skilled in the art that various changes and modification may be made therein without departing from the spirit of the invention. Although the sheet thickness sensing apparatus embodying the present invention is applied to an ink jet printer, it may be applied to all image recording apparatuses requiring a sheet thickness sensing function. Furthermore, a recording head adjusting technique may be applied not only to the ink jet printer but also to all recording apparatuses using ink jet recording, for example, to a facsimile machine of the ink jet recording. When sensing the thickness of the sheet, other sheet thickness sensing apparatuses as disclosed in the above Korea Patent Application No. 94-12167 may be used instead of the inventive sheet thickness sensing apparatus. Further, instead of dividing the driving enable time of the recording head or the head gap into 3 ranges according to the thickness of the sheet, its adjusting steps may be minutely classified for more precise adjustment. Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for automatically adjusting a recording head in an ink jet recording apparatus having a thickness sensing apparatus which is installed at a sheet convey path and senses the thickness of a fed sheet, said method comprising the steps of:

sensing the thickness of said sheet by said thickness sensing apparatus when said sheet reaches said thickness sensing apparatus after said sheet is fed; said thickness being sensed by a reflective optical sensor which is separately installed opposite to a reflective surface moving correspondingly according to the thickness of a fed sheet; and adjusting a head driving enable time of said recording head correspondingly to the sensed thickness of said sheet.

2. A method for automatically adjusting a recording head as claimed in claim 1, said adjusting step adjusting said head driving enable time in proportion to the thickness of said sheet.

3. A method for automatically adjusting a recording head as claimed in claim 2, said adjusting step shortens said head driving enable time when the thickness of said sheet is thin, and lengthens said head driving enable time when the thickness of said sheet is thick.

4. A method for automatically adjusting a recording head in an ink jet recording apparatus having a thickness sensing apparatus which is installed at a sheet convey path and senses the thickness of a fed sheet and having a gap adjusting apparatus for adjusting the height of said recording head, said method comprising the steps of:

sensing the thickness of said sheet by said thickness sensing apparatus when said sheet reaches said thickness sensing apparatus after said sheet is fed; said thickness being sensed by a reflective optical sensor which is separately installed opposite to a reflective surface moving correspondingly according to the thickness of a fed sheet; and adjusting a head gap between said recording head and said sheet correspondingly to the sensed thickness of said sheet by said gap adjusting apparatus.

5. A method for automatically adjusting a recording head as claimed in claim 4, said adjusting step adjusting the height of said recording head by adjusting the height of a horizontal moving axis of a carriage mounting said recording head.

6. A method for automatically adjusting a recording head as claimed in claim 5, said adjusting step adjusting the height of said recording head so as to be in proportion to the thickness of said sheet.

7. A method for automatically adjusting a recording head as claimed in claim 6, said adjusting step makes the height of said recording head low when the thickness of said sheet is thin, and makes the height of said recording head high when the thickness of said sheet is thick.

8. A method for automatically adjusting a recording head as claimed in claim 7, said adjusting step adjusts the height of said recording head after initializing the height of said recording head.

9. A sheet thickness sensing apparatus of an image recording apparatus, comprising:

feed roller for conveying a fed sheet;

a friction roller assembly having a friction roller which is in contact with said feed roller and having a friction roller guide which fixes said friction roller elastically and has a reflective surface, said friction roller assembly pressing said sheet to said feed roller by said friction roller; and a thickness sensing circuit having a reflective optical sensor which is separately installed opposite to said reflective surface of said friction roller guide, said thickness sensing circuit generating a sheet thickness value corresponding to a reflective optical quantity from said reflective surface sensed by said reflective optical sensor.

10. A sheet thickness sensing apparatus as claimed in claim 9, one end of said friction roller guide being connected to said friction roller and the other end thereof having said reflective Surface.

11. A sheet thickness sensing apparatus as claimed in claim 10, said reflective surface moving in a direction opposite to a moving direction of said friction roller shifted by said sheet.

12. A sheet thickness sensing apparatus as claimed in claim 11, a gap between said reflective surface and said optical sensor varying in proportion to the thickness of said sheet.

13. A recording head automatic adjusting apparatus of an ink jet recording apparatus, comprising:

a thickness sensing apparatus installed at a sheet convey path, for sensing the thickness of a fed sheet; said thickness sensing apparatus comprising:

feed roller for conveying a fed sheet to a recording head;

a friction roller assembly having a friction roller which is in contact with said feed roller and having a friction roller guide which fixes said friction roller elastically and has a reflective surface, said friction roller assembly pressing said sheet to said feed roller by said friction roller; and a thickness sensing circuit having a reflective optical sensor which is separately installed opposite to said reflective surface of said friction roller guide, said thickness sensing circuit generating a sheet thickness value corresponding to a reflective optical quantity from said reflective surface; and a controller for adjusting a head driving enable time of a recording head correspondingly to the thickness of the sheet sensed by said thickness sensing apparatus.

14. A recording head automatic adjusting apparatus as claimed in claim 13, said controller adjusting said head driving enable time correspondingly to said sheet thickness value generated by said thickness sensing circuit when said sheet reaches a contact surface between said feed roller and said friction roller after said sheet is fed.

15. A recording head automatic adjusting apparatus as claimed in claim 14 one end of said friction roller guide being connected to said friction roller and the other end thereof having said reflective surface.

16. A recording head automatic adjusting apparatus as claimed in claim 15, said reflective surface moving in a direction opposite to a moving direction of said friction roller shifted by said sheet.

17. A recording head automatic adjusting apparatus as claimed in claim 16 between said reflective surface and said optical sensor varying in proportion to the thickness of said sheet.

18. A recording head automatic adjusting apparatus as claimed in claim 17 said controller adjusting said head driving enable time so as to be in proportion to said sheet thickness value.

19. A recording head automatic adjusting apparatus as claimed in claim 18, said controller adjusting said head driving enable time by controlling a head driver for driving said recording head.

20. A recording head automatic adjusting apparatus as claimed in claim 19, said controller adjusting said head driving enable time correspondingly to a range of said sheet thickness values among a plurality of differently set adjusting ranges of values.

21. A recording head automatic adjusting apparatus of an ink jet recording apparatus, comprising:

a thickness sensing apparatus installed at a sheet convey path, for sensing the thickness of a fed sheet; said thickness sensing apparatus comprising:
  feed roller for conveying said fed sheet to said recording head;
  a friction roller assembly having a friction roller which is in contact with said feed roller and having a friction roller guide which fixes said friction roller elastically and has a reflective surface, said friction roller assembly pressing said sheet to said feed roller by said friction roller; and
  a thickness sensing circuit having a reflective optical sensor which is separately installed opposite to said reflective surface of said friction roller guide, said thickness sensing circuit supplying a sheet thickness value corresponding to a reflective optical quantity from said reflective surface to said controller;

a gap adjusting apparatus for adjusting the height of a recording head; and a controller for adjusting a head gap between said recording head and said sheet by controlling said gap adjusting apparatus so as to correspond to the thickness of said sheet sensed by said thickness sensing apparatus.

22. A recording head automatic adjusting apparatus as claimed in claim 21, said gap adjusting apparatus comprising:

a carrier shaft of a cam structure for providing a horizontal moving axis with respect to a carriage mounting said recording head, both horizontal end portions of said carrier shaft being installed to be rotated at a frame;

a gap adjusting motor connected to one horizontal end portion of said carrier shaft by gears, for altering the height of said horizontal moving axis by rotating said carrier shaft; and a motor driver for driving said gap adjusting motor according to the control of a driving direction and of the number of pulses of said controller.

23. A recording head automatic adjusting apparatus as claimed in claim 22, one end of said friction roller guide being connected to said friction roller and the other end thereof having said reflective surface.

24. A recording head automatic adjusting apparatus as claimed in claim 23, said reflective surface moving in a direction opposite to a moving direction of said friction roller shifted by said sheet.

25. A recording head automatic adjusting apparatus as claimed in claim 24, a gap between said reflective surface and said optical sensor varying in proportion to the thickness of said sheet.

26. A recording head automatic adjusting apparatus as claimed in claim 25, said controller adjusting said head gap so as to be in proportion to said sheet thickness value.

27. A recording head automatic adjusting apparatus as claimed in claim 26, said controller adjusting said head gap by controlling a head driver for driving said recording head.

28. A recording head automatic adjusting apparatus as claimed in claim 27, said controller adjusting said head gap correspondingly to a range of said sheet thickness values among a plurality of differently set adjusting ranges of values.

* * * * *